A. H. SNYDER.
STORAGE BATTERY CELL.
APPLICATION FILED OCT. 24, 1913.
1,127,936.
Patented Feb. 9, 1915.
2 SHEETS—SHEET 1.
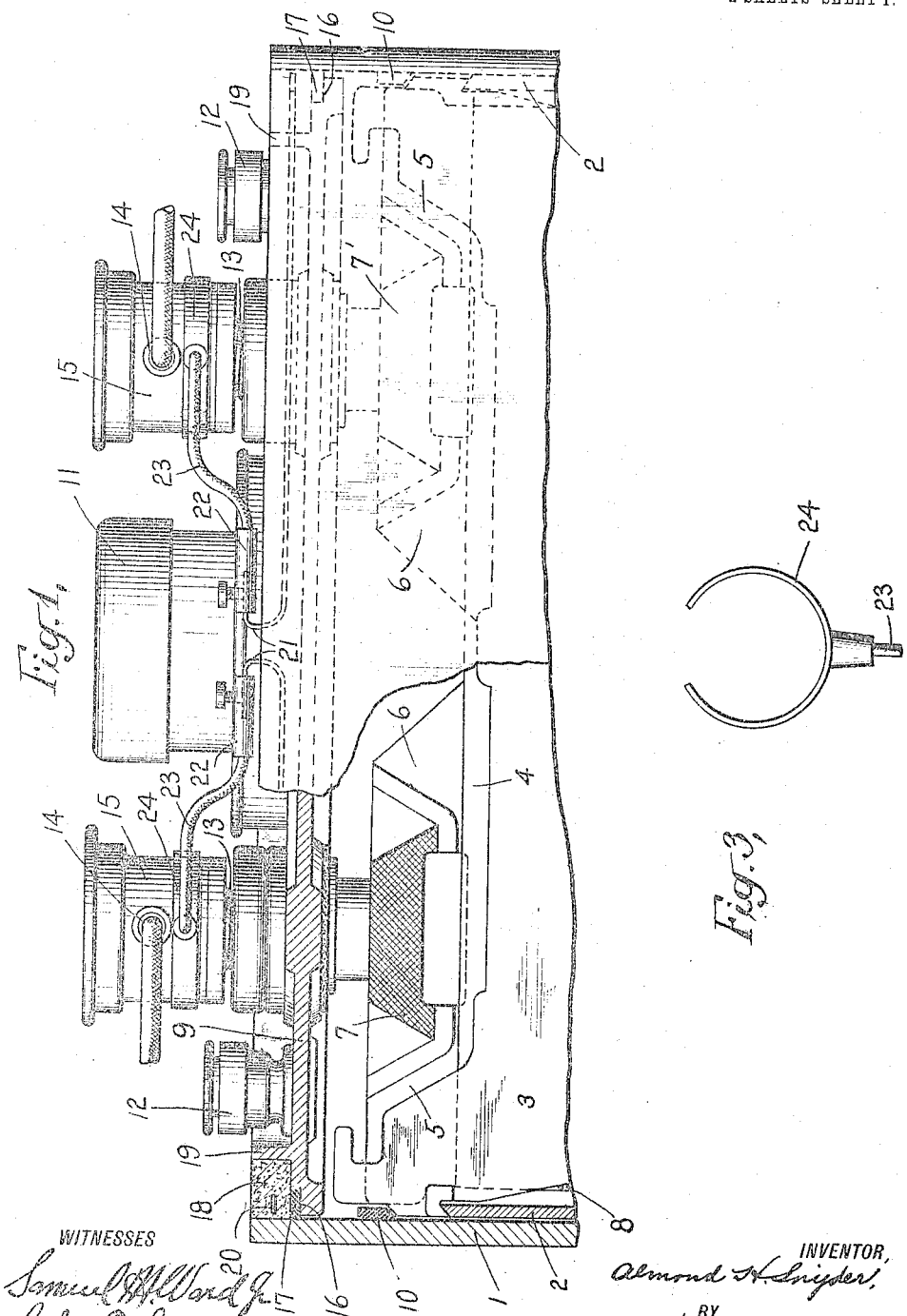
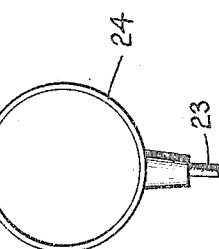

A. H. SNYDER.
STORAGE BATTERY CELL.
APPLICATION FILED OCT. 24, 1913.
1,127,936. Patented Feb. 9, 1915.
2 SHEETS—SHEET 2.
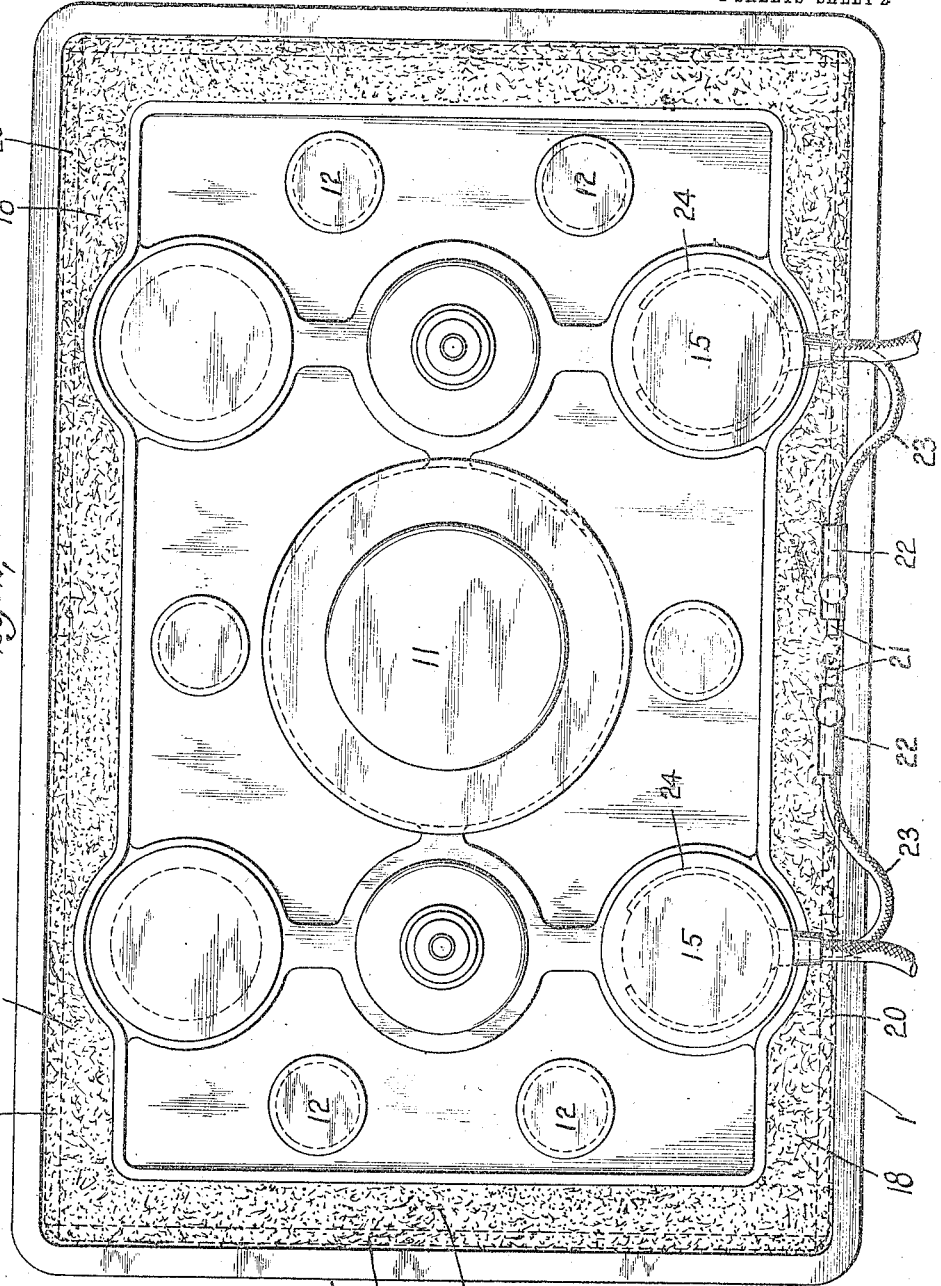

UNITED STATES PATENT OFFICE.

ALMOND H. SNYDER, OF LANCASTER, NEW YORK, ASSIGNOR TO GOULD STORAGE BATTERY COMPANY, A CORPORATION OF NEW YORK.

STORAGE-BATTERY CELL.

1,127,936.  Specification of Letters Patent.  Patented Feb. 9, 1915.

Original application filed August 15, 1912, Serial No. 715,147. Divided and this application filed October 24, 1913. Serial No. 796,994.

*To all whom it may concern:*

Be it known that I, ALMOND H. SNYDER, a citizen of the United States, and a resident of Lancaster, in the county of Erie and State of New York, have invented a new and useful Improvement in Storage-Battery Cells, of which the following is a specification.

My invention relates to storage battery cells and more particularly to the sealing and unsealing of the covers of the battery jars.

The objects of the invention are to provide means for sealing covers on the jars and means for unsealing the covers and for repairing leaks in the sealing compound, and the invention consists in efficient and durable means for readily attaining these objects.

Further features and advantages of the invention will more fully appear from the following description taken in connection with the accompanying drawings forming a part of this specification, and in which—

Figure 1 is a side elevation of a storage battery cell, partly in section, provided with the preferred embodiment of my invention; Fig. 2 is a top plan view of said cell; and Fig. 3 shows a detail.

Referring to the drawings, 1 represents a hard rubber battery jar provided at its sides with glass plates 2 for supporting the positive and negative battery plates 3 and 4. The plates are each provided with upwardly extending lugs 5 and 6, the lugs 5 and 6 being lead burned to positive and negative bus bars 7, 7', respectively. Between the positive and negative plates 3 and 4 are placed suitably supported separating strips 8. The cell jar is closed by a cover 9 and the positive and negative plates 3 and 4 are held spaced apart at the points where they are supported by the glass plate 2 by rubber separating strips 10. The center of the cover 9 is provided with a suitable ventilating outlet duct 11 and the cover is also provided with two ventilating inlet ducts 12 located near the ends of the cell. From each of the negative and positive bus bars 7, 7' there extends a terminal 13. Each terminal extends up through the cover 9 and is provided with some suitable terminal connection piece 14, the terminal and the connection piece in the particular illustration shown being protected by a suitable non-corrodible casing 15 which, so far as my present invention is concerned, may be considered as a part of the terminal itself.

The cover 9 at its outer edge has a groove 16 formed therein extending around the cover, in which is placed a strip 17 of suitable material, preferably some soft or flexible material as, for example, soft rubber, which is adapted to fit against the shoulder of the groove so as to be pressed tightly against the inner wall of the jar to prevent leakage between the cover and the inner wall of the jar, of a sealing compound 18 which, in the embodiment of the invention shown, is confined above this strip in a trough formed by the inner wall of the jar, the edge of the cover and a vertically projecting flange or ridge 19 projecting up from the top surface of the jar. The compound may be any bituminous or asphaltum compound. The ridge 19 not only serves the purpose of holding the compound in place while hot so that it may be readily and economically applied and pressed firmly down between the inner wall of the jar and the cover by simply pressing upon it, but it also serves the important purpose of preventing any water or acid which may accumulate on the top of the cover from leaking under the sealing compound and destroying the seal. By having this flange or ridge extending upward from the surface of the cover a relatively deep trough may be provided for the sealing compound without increasing the thickness or depth of the cover. This trough holds the sealing compound in place so that it can be neatly applied when sealing the jar, and when unsealing the jar the compound will be held in position where it can again be used without waste.

In order to readily unseal the jar and to repair leaks in the seal, I provide within the sealing compound and preferably to one side of the center thereof and near the wall of the jar, a conductor 20 embedded in the compound and extending along the trough, with its ends 21 projecting out of the compound for receiving terminal or connection pieces 22. To these terminal pieces 22 are secured conductors 23 having connection pieces 24 adapted to fit the terminals from the plates, and in the preferred embodiment of the invention I provide these connection pieces in the form of circular spring clips, as shown in Fig. 3, so that they may be snapped around any suitable portion of the terminal when it is desired to connect up the conductor 20 with the battery to melt the sealing compound, either for the purpose of unsealing the cover or to soften the compound in case of a leak so that it may be pressed in at that point to repair the same.

While I have described in detail the preferred embodiment of my invention, it is obvious to those skilled in the art that different changes in the construction and arrangement of the parts may be made without departing from my invention, and I do not wish to be understood as limiting the invention other than as indicated in the appended claims.

This is intended as a division of my copending application for improvements in storage batteries Serial No. 715,147 filed August 15, 1912.

Having thus described my invention, what I claim as new and desire to secure by Letters Patent, is:—

1. The combination of a storage battery jar having negative and positive plates therein, terminals for the plates, a cover for the jar, a sealing compound extending around the edges of the cover and sealing the cover to the jar, a conductor embedded in the sealing compound, terminals to which the conductor is connected, conductors connected to said terminals, and connection pieces secured to said last conductors and adapted to fit the terminals of the plates, whereby the sealing compound may be softened by connecting the connection pieces to the battery terminals.

2. The combination of a storage battery jar having negative and positive plates therein, terminals for the plates, a cover for the jar having a part near its edges forming, with the inner wall of the jar, a trough extending around the edges of the cover, a sealing compound in said trough for sealing the cover to the jar, a conductor embedded in said sealing compound, terminals to which the ends of the conductor are connected, and means for connecting said conductor terminals to the terminals of the plates for conveying current through said conductor to soften the said compound.

3. The combination of a storage battery jar, a cover for the jar having a portion near its edges which forms with the adjacent inner walls of the jar a trough extending around the cover, a sealing compound within the trough, and a strip of compressible material at the bottom of the trough below the sealing compound and extending beyond the edges of the cover into engagement with the inner walls of the jar to prevent the sealing compound, when hot, from getting down between the extreme edges of the cover and the adjacent walls of the jar.

4. The combination of a storage battery jar, a cover for the jar having a portion near its edges which forms with the inner walls of the jar a trough extending around the cover, a sealing compound within the trough, a strip of compressible material supported on the cover at the bottom of the trough below the sealing compound and extending beyond the cover into engagement with the inner walls of the jar to prevent the sealing compound, when hot, from getting down between the extreme edges of the cover and the adjacent walls of the jar, and means backing up said strip to hold it from lateral movement closely against the said walls of the jar.

5. The combination of a battery jar, a cover for the jar having a ridge projecting up from the top surface of the jar and extending around the edges thereof to form with the inner wall of the jar and the outer edges of the cover a trough for receiving a sealing compound and projecting said compound from accumulated liquid on the cover of the jar, and said sealing compound within said trough for sealing the cover on said jar.

6. The combination of a battery jar, a cover for the jar having a groove formed around its edges, a strip of flexible material within said groove and tightly fitting the inner walls of the jar, a ridge formed in the cover extending above said groove, and a sealing compound extending around the cover above the flexible strip and confined between said ridge and the inner walls of the jar.

7. The combination of a storage battery jar, a cover for the jar having a ridge or flange extending upwardly from its surfaces near the extreme edges of the cover and extending around the cover to form with the adjacent inner surface of the jar and projecting portion of the cover between the inner surface of the jar and said ridge a trough, a strip of compressible material overlapping the edge of the cover and extending around the same and into close engagement with the adjacent inner surface of the walls of the jar above the extreme edges of the cover, and a sealing compound within the trough above said strip of compressible material.

In testimony whereof, I have signed my name to this specification, in the presence of two subscribing witnesses.

ALMOND H. SNYDER.

Witnesses:
P. W. ENGLISH,
JOSEPH MURPHY.